Dec. 7, 1943.                C. B. NEILL                2,336,283
                        WELDING ARC PROTECTOR
                        Filed Aug. 21, 1942
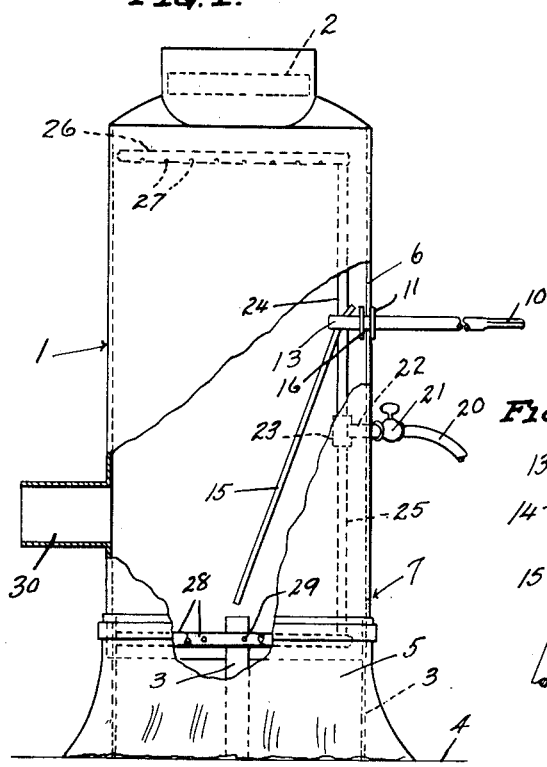
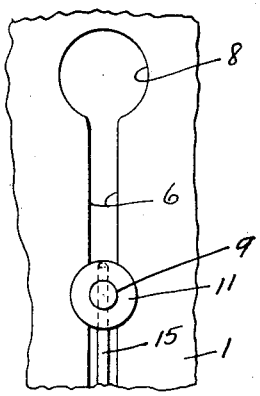
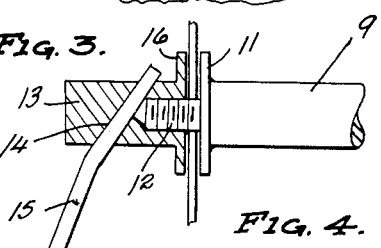
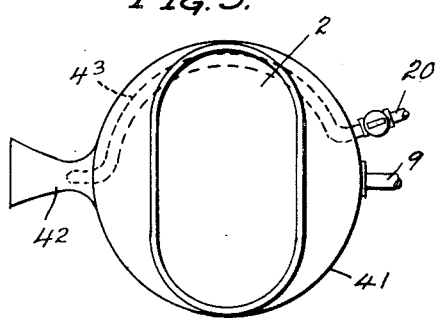
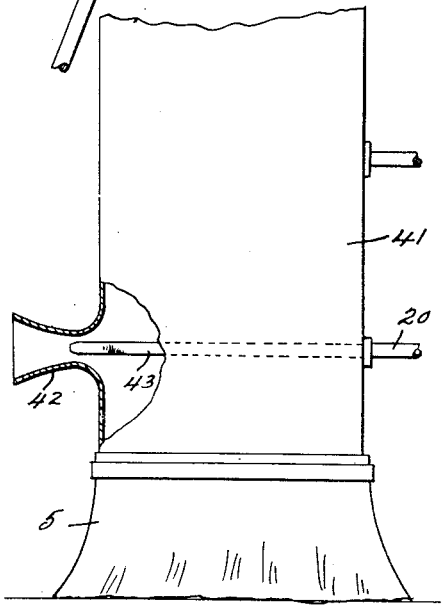
INVENTOR.
CLYDE B. NEILL
BY
Boykin, Mohler & Beckley
ATTORNEYS

UNITED STATES PATENT OFFICE 2,336,283

WELDING ARC PROTECTOR

Clyde B. Neill, Pearl Harbor, Territory of Hawaii

Application August 21, 1942, Serial No. 455,653

9 Claims. (Cl. 219—8)

This invention relates to an arc protector, and has for one of its objects a relatively light, portable, simple, and economically made device adapted to afford greater protection to the user of welding apparatus from the light, burns and objectionable fumes resulting from welding operation, than heretofore.

Another object of the invention is an arc protector that enables the user of welding apparatus to perform a better job with more comfort than at present.

Heretofore in welding operations it is customary for the welder to wear a leather jacket and trousers or other protective garment to protect himself during a welding job. These garments are hot and uncomfortable and any part of the wearer exposed to the light of the arc will burn. Also, even though the welder himself may by the use of a shield, hood, goggles, etc. protect his eyes from the light rays, it frequently occurs that the eyes of the welder himself, through accident, or the eyes of other workmen or others may be exposed to the arc rays in a manner to temporarily blind the person, causing what may be called "eye flash," thus incapacitating the injured person for a period of time.

With my invention fast and accurate welding may be accomplished in comparative safety and comfort by the welder and also others nearby are protected against injury.

In the drawing Fig. 1 is a part sectional, part elevational view of a device illustrating my invention.

Fig. 2 is a fragmentary enlarged elevational view of a portion of the device of Fig. 1.

Fig. 3 is an enlarged fragmentary, part sectional and part elevational view of another portion of my device.

Fig. 4 is a fragmentary elevational and part sectional view illustrating a slightly different form of the invention.

Fig. 5 is a plan view of the device of Fig. 4.

In detail, a vertically disposed tubular body 1 is provided at its upper end with an opening that is closed by a welding glass 2 and holder therefor, which glass may be positioned in any desired angle or may be of any desired shape to seal the upper end of the body and to provide means for viewing the welding operation performed at the lower end of said body. Any suitable eye rest may be provided adjacent the glass, such as a flange projecting upwardly or outwardly from the edges of the glass.

The lower end of the body 1 is open, and supporting legs 3 secured to said body may project downwardly from the body for supporting the body and parts secured thereto on a supporting surface 4 during welding or at any other time.

Depending from the lower edge of the body 1 is a flexible asbestos skirt 5, which skirt is generally tubular in form and preferably is longer than the legs so that its free lower edges may contact the surface on which the body 1 is supported. The flexibility of the skirt is such that its lower edge will slidably engage the surface 4, and will yield to pass over any slight obstructions or irregularities as well as conforming to variations in the contour of surface 4.

One side of the body 1 is formed with a vertically disposed slot 6 the lower end of which preferably terminates adjacent the lower end of body 1 at about point 7 (Fig. 1) and the upper end of which is enlarged as at 8 (Fig. 2), and which enlargement is near the upper end of said body.

The welding rod holder comprises a bar 9 formed at its outer end 10 for the conventional electrical connection. This bar 9 has a radially outwardly extending flange 11 (Figs. 1, 3) rigid therewith, and a threaded extension 12 (Fig. 3) on said rod extends axially thereof past said flange. This extension is almost the same diameter as the width of the slot 6, but has slidable clearance relation thereto.

Threadedly secured on extension 12 is a relatively short member 13 in axial alignment with rod 9, and which member 13 is formed with a transverse passage 14 adapted to receive the upper end of the welding rod 15 therein. Passage 14 of member 13 extends across the outer end of the thread recess that receives the extension 12, and the member 13 has a radially outwardly projecting flange 16 thereon at the end of the member 13 adjacent flange 11. This flange 16 is slightly smaller than the diameter of the enlarged end 8 of slot 6, so as to pass through said slot, and the depth of the threaded recess receiving extension 12 is such that the end of extension 12 clamps the welding rod in passage 14 and to said member 13 when the bar 9, which also functions as a handle, is turned to tighten the extension in the passage 14. Obviously the flanges 11 and 16 are of greater diameter than the width of slot 6. The depth of the recess in which extension 12 is threaded is such that the flanges 11, 16 are spaced apart a distance slightly greater than the thickness of the marginal portion of body 1 along the edges of slot 6.

When the welding rod holder above described is in welding position, the extension 12 is disposed in slot 6 and the flanges 11, 16 overlie the marginal portions along the edges of the slot. Thus the operator may raise and lower the welding rod by raising and lowering the handle, or bar 9, and at the same time observe the welding operation through the glass 2. The rod 15 preferably extends angularly downwardly from the member 13 so its lower end will be about centrally within the body 1 or centrally within the area enclosed by skirt 5. By canting the bar 9 slightly, the flanges 11, 16 will grip the marginal portion of body 1 along the edges of slot 6, so as to lock with the body to permit carrying of the latter. Should the operator merely lower the outer end of bar 9, the same gripping action will occur and the bar will be supported on the body after the operator has released the bar 9.

A compressed air line 20 is connected by a valve 21 to a pipe 22, and which pipe 22 extends through an opening in one side of the body 1 adjacent slot 6. A T fitting 23 on pipe 22 adjacent the inner side of said body provides a connection for pipes 24, 25 that extend vertically upwardly and downwardly, respectively, from said fitting. Pipe 24 is connected at its upper end with an annular pipe 26 that extends around the inner side of the body, and which pipe 26 is provided with a row of generally downwardly directed apertures 27 on its lower side.

The pipe 25 is connected at its lower end with an annular pipe 28 extending around the inner side of body 1, which pipe has radially inwardly directed apertures 29 therein, except for the portion of the pipe that extends below an outwardly projecting vent tube 30 located in the side of the body 1 in the lower portion thereof opposite slot 6.

The pipes 26, 28 are preferably concentric with the central vertical axis of the body 1 and the vent tube 30 is fairly large having a capacity to freely exhaust the welding gases and air within the body 1.

In operation, the welder positions the body 1 over the area or point to be welded, and legs 3 that support the body may be slid along the supporting surface 4 as the welding progresses. The welder turns on the air in line 20, which air carries the welding gas out of body 1 through tube 30, keeping the interior of the body clear for viewing the welding operation, and also cooling the body.

In Figs. 4, 5, I show a modification of my device, in which the body 41 is the same as body 1, except that a vent tube 42 is provided instead of the tube 30. This vent tube 42 is in the form of a venturi, and instead of using pipes 26, 28 as shown in Fig. 1, I provide a single, imperforate pipe 43 connected with the air line. This pipe 43 extends around one half of the inner side of the body 41, and within the tube 42 at its outer end. This outer end terminates at about the neck of the venturi and has a discharge aperature at said end.

In operation, when the air is turned on, a relatively powerful suction is created in tube 42 that sucks the welding gas from within body 1 and forcibly discharges it from within the body outwardly. In this form of device the slot 6 admits air to within the body during the suction action at the opposite side of the body from the vent tube 42, thus insuring a passage of fresh air across the interior of the body with which the welding gases are entrained.

It is to be understood that various modifications may be made in the devices above described, such as in the particular construction and location of the glass 2, or in the precise location of the vent tubes, as well as in the form of legs 3, and other details. The flanges 11, 16 on the welding rod holder may be washers, and various other details may be structurally modified without departing from the invention.

Having described my invention, I claim:

1. A welding arc protector comprising a hollow body open at its lower side and provided with a viewing opening at its upper side fitted with a welding glass, a welding rod holder extending through a side wall of said body for supporting a welding rod within said body extending downwardly to the lower open end of the body; frictionally gripping means releasably engaging the side wall of said body for adjustably supporting said holder for vertical movement relative to said body; and means for forcibly ejecting welding fumes from within said body during welding.

2. A welding arc protector comprising a hollow body provided with an opening in its lower side and a welding glass fitted in the upper side thereof for viewing the welding operation; a welding rod within said body terminating at its working end adjacent said opening; vertically slidable frictionally gripping means releasably engaging the side wall of said body for adjustably supporting said rod for vertical movement relative to said body; said means including a handle projecting outwardly from a side of said body for manually raising and lowering said rod; a relatively flexible heat and fire resistant skirt carried by said body and depending from the edges of said opening; and means for supporting said body spaced above a supporting surface with the lower edges of said skirt adjacent such surface.

3. A welding arc protector comprising a welding chamber and having a vertically extending tubular body provided with a viewing glass at its upper end; the lower end of said body being open; a welding rod support extending through and slidably frictionally engaging one of the sides of said body, said rod support being provided with a welding rod holder disposed within said body; said support extending outwardly from a side of said body for manual manipulation thereof outwardly of the body for adjusting elevation and directional movement of the free end of the welding rod; a vent opening formed in one side of said body for venting fumes within the body; a flexible fire and heat resistant skirt depending from the lower end of said body around said lower open end whereby the skirt may maintain closure of the welding chamber at its lower end relative to irregular surfaces; and legs carried by said body for supporting the latter on a supporting surface spaced above such surface.

4. A welding arc protector comprising a generally vertically extending tubular body provided with a viewing glass at its upper end and open at its lower end; a flexible fire and heat resistant generally tubular skirt depending from the lower end of said body and generally in downward continuation of the sides of said body; a generally vertical slot in one side of said body; a welding rod holder extending through said slot adapted to support a welding rod within the body, said holder being movable vertically in the slot; and compressed air actuated means for forcibly ejecting welding fumes from within said body during welding.

5. A welding arc protector comprising a generally vertically extending tubular body provided with a viewing glass in its upper end and being open at its lower end; a vertically adjustable welding rod holder releasably frictionally held generally horizontally through a side of said body and projecting both inwardly and outwardly therefrom; a welding rod secured to the inwardly projecting portion of said holder within said body and projecting from the holder to a point adjacent the lower open end of the said body; the said body at its lower open end being provided with a connected tubular skirt of relatively flexible fire and heat resistant material; supports carried by said body for supporting the said latter portion in engagement with a supporting surface; a tubular vent in a side of said body projecting therefrom; and compressed air actuated means spaced within said vent tube for discharging air therein outwardly of said body for clearing the interior of said body from welding fumes.

6. A welding arc protector comprising a generally vertically extending tubular body provided with a viewing glass at its upper end and being open at its lower end; a generally vertical slot formed in a side of said body; a welding rod support vertically slidable in said slot provided with a handle outside said body and a holder for a welding rod within said body; means carried by said support adjacent said slot and adjacent the inner and outer sides of said body adapted to frictionally clasp said holder to said body upon predetermined angular movement of said holder relative to said body about a horizontal axis extending between opposite edges of said slot; said means including spaced members overlying the marginal portions of the body along opposite edges of said slot.

7. In a construction as defined in claim 6, said handle being formed with a threaded end portion threadedly secured in a recess in said rod holder; and means for releasably securing a welding rod to said holder, including said threaded end portion of said handle when said end portion is tightened in said holder, the depth of the threaded recess of said holder being such that when the threaded end of the handle engages the welding rod the frictional clasping means will be slidable relative to the slot in the body.

8. A welding arc protector comprising a generally vertically extending tubular body provided with a viewing glass in its upper end and being open at its lower end; legs projecting downwardly from the lower end of said body for supporting said body elevated above a supporting surface; a generally tubular skirt of flexible, fire and heat resistant material carried by said body coaxial therewith and depending from the lower end edges of said body to said supporting surface when said legs are on the latter holding said body elevated thereabove; a welding rod within said body and a holder extending through a side of said body supporting said holder with its working end projecting from said lower open end of said body; compressed air actuated means within said body for forcibly ejecting welding fumes from within said body; and means carried by said holder for adjustably securing the holder to said body at different vertically spaced points relative to said body lower open end.

9. In a construction as defined in claim 8, said compressed air actuated means including a Venturi tube in a side of said body, and an air discharge nozzle spaced within said tube for ejecting air into the said tube outwardly thereof and outwardly relative to the interior of said body.

CLYDE B. NEILL.